US011565362B2

(12) United States Patent
Bovone

(10) Patent No.: US 11,565,362 B2
(45) Date of Patent: Jan. 31, 2023

(54) MODULAR APPARATUS AND METHOD FOR MACHINING FLAT SHEETS

(71) Applicant: ELETTROMECCANICA BOVONE SRL, Ovada (IT)

(72) Inventor: Vittorio Bovone, Ovada (IT)

(73) Assignee: ELETTROMECCANICA BOVONE SRL, Ovada (IT)

(*) Notice: Subject to any disclaimer, the term of this patent is extended or adjusted under 35 U.S.C. 154(b) by 959 days.

(21) Appl. No.: 16/318,777

(22) PCT Filed: Jul. 26, 2017

(86) PCT No.: PCT/IB2017/054524
§ 371 (c)(1),
(2) Date: Jan. 18, 2019

(87) PCT Pub. No.: WO2018/020430
PCT Pub. Date: Feb. 1, 2018

(65) Prior Publication Data
US 2019/0283199 A1    Sep. 19, 2019

(30) Foreign Application Priority Data

Jul. 27, 2016 (IT) .......................... UA2016A005553

(51) Int. Cl.
*B24B 9/10* (2006.01)
*B24B 27/00* (2006.01)
(Continued)

(52) U.S. Cl.
CPC ................ *B24B 9/102* (2013.01); *B24B 9/02* (2013.01); *B24B 9/06* (2013.01); *B24B 9/10* (2013.01);
(Continued)

(58) Field of Classification Search
CPC .. B24B 9/102; B24B 9/02; B24B 9/06; B24B 9/10; B24B 27/0023; B24B 27/0069;
(Continued)

(56) References Cited

U.S. PATENT DOCUMENTS

| 2003/0181149 | A1 | 9/2003 | Shin |
| 2004/0209557 | A1 | 10/2004 | Gariglio |
| 2011/0144270 | A1 | 6/2011 | Fouarge et al. |

FOREIGN PATENT DOCUMENTS

| DE | 202014010362 U1 | 5/2015 |
| EP | 2687327 A1 | 1/2014 |

(Continued)

OTHER PUBLICATIONS

U-shaped assembly lines by Gerald Aase (Year: 2000).*
EP2939787_Translated_description (Year: 2015).*
Definition-B25J9_046(Anthropomorphic) (Year: 2022).*

*Primary Examiner* — Joel D Crandall
*Assistant Examiner* — Jacob Adam Montgomery
(74) *Attorney, Agent, or Firm* — Dickinson Wright PLLC; Andrew D. Dorisio

(57) ABSTRACT

A modular apparatus (10) for machining flat sheets, in particular glass, plate glass, or mirror sheets or sheets made from stone materials or the like, comprising machining moduli consisting of a first store (16) suitable for receiving sheets to be machined (25) and a second store (18) suitable for receiving machined sheets (27), a first grinding machine (12), and a second grinding machine (14) suitable for performing grinding machinings along the peripheral edges of said sheets (25), one or more further moduli for machining said flat sheets, if any, of the corner cutting, drill, or washing machine types, possibly associated with said first and second grinding machines (12, 14), and interface means for transferring said flat sheets between said machining moduli.

10 Claims, 6 Drawing Sheets

Figure 1:
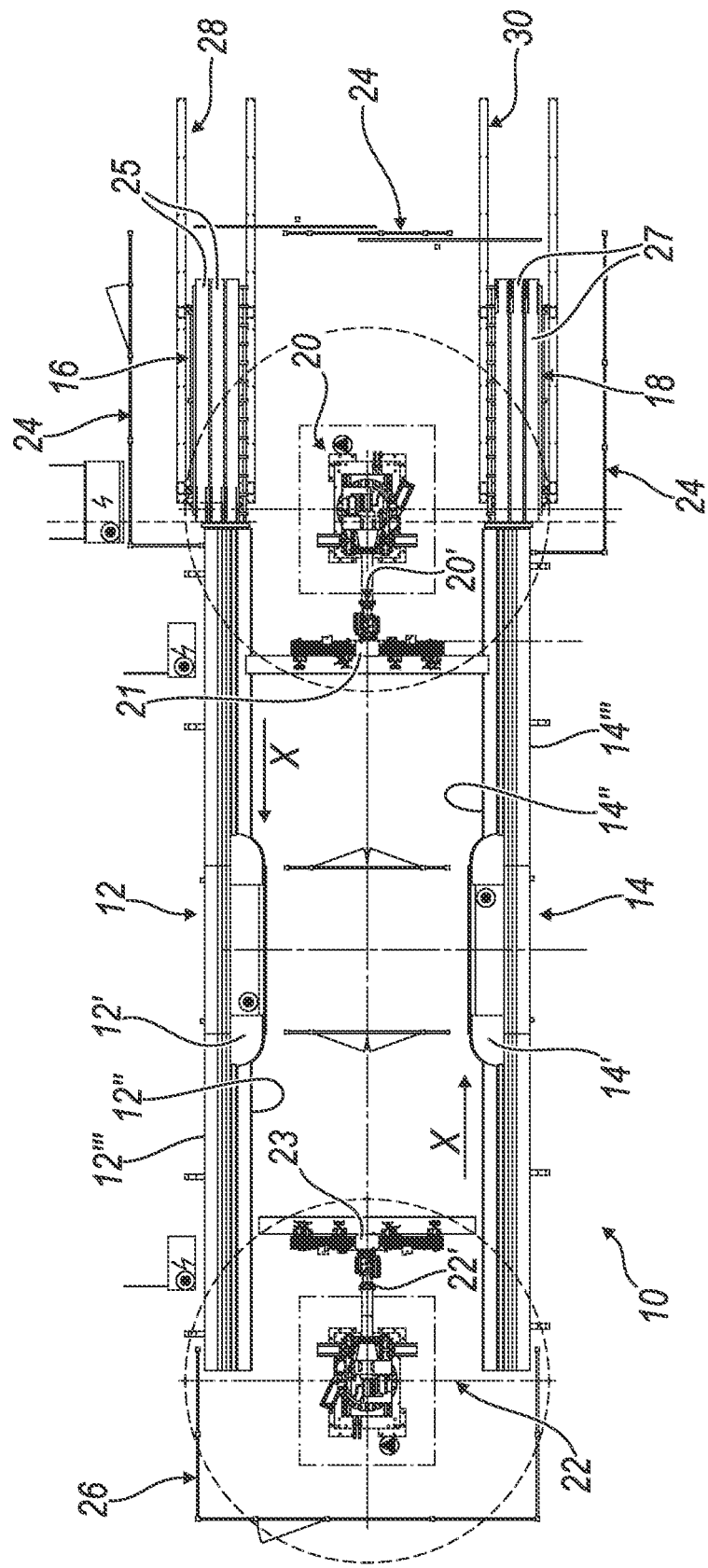

(51) Int. Cl.
  *B24B 41/00* (2006.01)
  *B24B 9/06* (2006.01)
  *B24B 9/02* (2006.01)
  *B25J 9/04* (2006.01)

(52) U.S. Cl.
  CPC ...... *B24B 27/0023* (2013.01); *B24B 27/0069* (2013.01); *B24B 41/005* (2013.01); *B25J 9/046* (2013.01)

(58) Field of Classification Search
  CPC . B24B 27/0076; B24B 41/005; B24B 41/068; B24B 9/06; B24B 7/242; B24B 7/244; B24B 7/245; B24B 13/0031
  USPC .......................................................... 451/44
  See application file for complete search history.

(56) References Cited

FOREIGN PATENT DOCUMENTS

| EP | 2939787 A2 | * 11/2015 | ........... B24B 41/005 |
|----|------------|-----------|------------------------|
| EP | 2939787 A2 | 11/2015 | |
| WO | WO2016055966 A1 | 4/2016 | |

\* cited by examiner

MODULAR APPARATUS AND METHOD FOR MACHINING FLAT SHEETS

TECHNICAL FIELD

The present invention refers to a modular apparatus and a method for machining flat sheets.

BACKGROUND

More specifically, the present invention refers to an apparatus for machining flat sheets and to a method according to which the mentioned apparatus operates, said apparatus being realized with the purpose of machining flat, glass or plate glass sheets, or mirrors or even flat sheets made from marble or granite, or other known stone materials.

Considering the specific case of glass, it is known that it is a material widely used in many sectors and for many and different applications.

Among the different types of glass, that referred to as flat glass is used both in the civil field and in the industrial field for implementing walls or for covering facades, for ornaments and floorings, for manufacturing decorative objects, and the like.

Furthermore, a glass sheet is either a single-layer or a multilayer one, i.e. a sheet resulting from the superposition of two or more flat glass sheets, possibly provided with films interposed therebetween and made from technopolymers of the polyvynilbutyral or PVB type or equivalent known materials used to obtain glasses featuring shatter-proof or bullet-proof properties or the like.

Flat glass sheets typically undergo different types of surface machinings such as, for instance, grinding machinings, aiming at eliminating the sharp and irregular edge of the glass sheet, corner cutting or drilling machinings, cutting machinings, washing machinings typically performed after the previously indicated machinings and before storing the machined flat sheets.

Such machinings are performed not only on glass or flat glass sheets, but also on sheets of different types such as, as indicated above, sheets made from stone materials.

Such machinings are performed manually or by way of appropriate machineries which are referred to as grinders or chamferers (for machining the peripheral edge), corner cutting machines or drills or even washing machines and the like.

If we consider an automatic machining and, for instance, a grinding machining, it is conventionally performed by loading the sheets, which are arranged vertically, onto the grinding machine, and the sheets are moved along a rectilinear direction, from a specifically designed transportation device, in the direction of a machining section wherein a set of variously arranged grinding wheels operate onto the edge of the sheet as a function of selected, specific machining parameters.

These machines perform the grinding machining onto each individual edge of the sheet and consequently said sheet shall be re-positioned time after time in order to perform the machining on all four edges of the sheet (assuming that such machining is requested along all the perimeter of the sheet).

The foregoing entails a number of major drawbacks related to the fact that re-positioning a sheet results in extending the machining times which, consequently, results in increasing manufacturing costs.

A number of technical solutions are based on the use of handlers which allow to handle the flat sheets to be machined.

For instance, document EP2939787 describes a method for machining flat sheets that uses a robot of an antropomorphic type for handling sheets from a store to a grinding machine, the robot supporting the sheet being machined while it is actually machined; such configuration, however, features a number of drawbacks related to the fact that the sheet is supported by the robot while it is machined, and consequently said robot will be subjected to stresses transmitted by the grinding machine during the machining and this affects the quality of the machining and the manufacturing costs and, also, results in drawbacks related to the fact that the robot is not able to process big size and/or very thick sheets.

Likewise, document DE202014010362 describes a machining configuration that uses two robots moving along a rail at the ground level and suitable for slaving grinding machines wherein, in particular, said robots support and retain the sheet during all machining steps; therefore, the same drawbacks are found as in document EP2939787.

In order to try to solve such drawbacks, grinding machines referred to as bilateral grinding machines have been developed, suitable for performing a grinding machining on all four edges of the sheet and internally to one and the same machining cycle.

More specifically, in this case, the grinding of the edges of the sheets takes place, the sheet being arranged according to a horizontal plane and the sheet is moved, first, between a first set of opposite grinding wheels which operate on two opposite and parallel edges of the sheet and, subsequently, while remaining arranged according to a horizontal plane, the mentioned sheet is rotated by 90° and moved between a second set of opposite grinding wheels which operate on the remaining two opposite and parallel edges of the sheet.

However, such grinding machines, even though they partially solve the problems of rectilinear grinding machines, feature a number of major drawbacks related to the fact that they feature substantial overall dimensions due to the fact that the sheets being machined are arranged and moved along a horizontal plane.

A further drawback consists in that they are complex constructionally because they require four sets of opposite grinding wheels which operate onto the opposite edges of the sheets, two by two.

Further disadvantageous is the fact that such type of grinding machine does not allow to manage a sheet edge grinding machining, for instance in the case that it is required to grind two adjacent, non-opposite edges, or even in the case that a sheet features a shape different from the square or rectangular one and, for instance, it consists of a sheet having a triangular or trapezoidal shape or the like.

In addition, the type of material and the speed of forward movement being equal, the quality of machining performed by a bilateral grinding machine is worse as compared to a normal grinding machine because, in the specific case of glass, said material has a better support on a grinding machine of the vertical type and, furthermore, a bilateral grinding machine makes it possible to always perform the same machining on the four sides of the sheet, whereas a vertical grinding machine makes it possible to perform different machinings on the sides, assuming the use of variable edge grinding machines, for instance two sides might be flat edge machined whereas the remaining two might be 45° chamfered.

An example of bilateral grinding machine is disclosed in document EP2687327 which makes reference to a bilateral grinding machine that performs a grinding machining on the edges of a sheet arranged according to a horizontal plane, said machining taking place by first operating onto a first pair or opposite edges and subsequently onto a second pair of opposite edges perpendicular to said first edges.

A further example of a sheet edge grinding machining by using a bilateral grinding machine is disclosed in document US2003/0181149 which makes reference to an apparatus consisting of a bilateral grinding machine for machining edges of sheets for LED screens.

The drawbacks bound to the sheet re-positioning problems, reported here above with reference to a grinding machining, are also found in performing other machinings, such as corner cutting or drilling or the like; as a matter of fact, a sheet that comes out from a grinding machine (be it vertical or bilateral) shall be re-positioned in order to perform a corner cutting; in the case of a bilateral grinding machine, for instance, a sheet shall be re-positioned according to a vertical plane after such machining.

SUMMARY

An object of the present invention is to obviate the above-mentioned drawbacks.

More specifically, an object of the present invention is to provide a modular apparatus and a respective method for grinding flat sheets made from glass, plate glass, mirrors or even sheets made from marble or other known stone materials, suitable for allowing different machinings on the sheets while optimizing the cycle time and radically reducing the dead times bound to handling such sheets.

A further object of the present invention is to provide a configurable and reconfigurable, modular apparatus, suitable for allowing said different types of machinings without any need for dedicated and special plants.

A further object of the present invention is to provide an apparatus suitable for allowing an easy machining of sheets even having different shapes (sheets of square, rectangular, rhomboidal, triangular shapes, etc.).

A further object of the present invention is to put at users' disposal an apparatus and a method for machining flat sheets, suitable for providing high strength and reliability over time and also such as to be realized in an easy and cost-effective manner.

These objects and others are achieved by the invention that features the characteristics according to claim 1.

According to the invention, a modular apparatus is provided for machining flat sheets, in particular sheets made from glass or plate glass, mirrors or sheets made from a stone material or the like, comprising machining moduli consisting of a first store suitable for storing sheets to be machined and a second store suitable for storing machined sheets, a first grinding machine and a second grinding machine suitable for performing grinding machinings along the peripheral edges of said sheets, one or several further sheets machining moduli, if any, such as corner cutting machines or drills or washing machines possibly associated with said first and second grinding machines, and interface means for transferring said flat sheets between such machining moduli.

Advantageous embodiments of the invention are apparent from the dependent claims.

BRIEF DESCRIPTION OF THE DRAWING FIGURES

Figure 2:
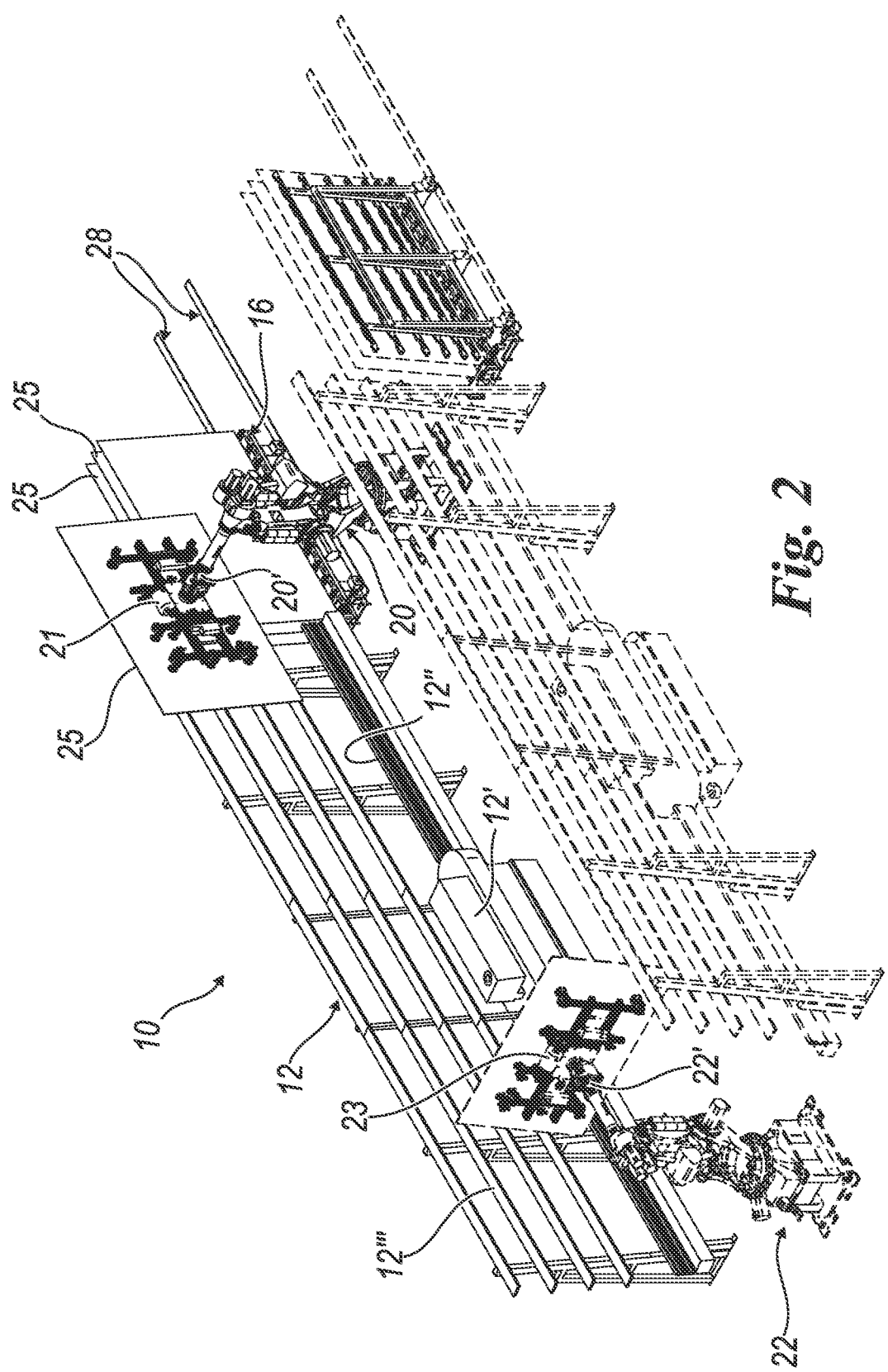
Figure 3:
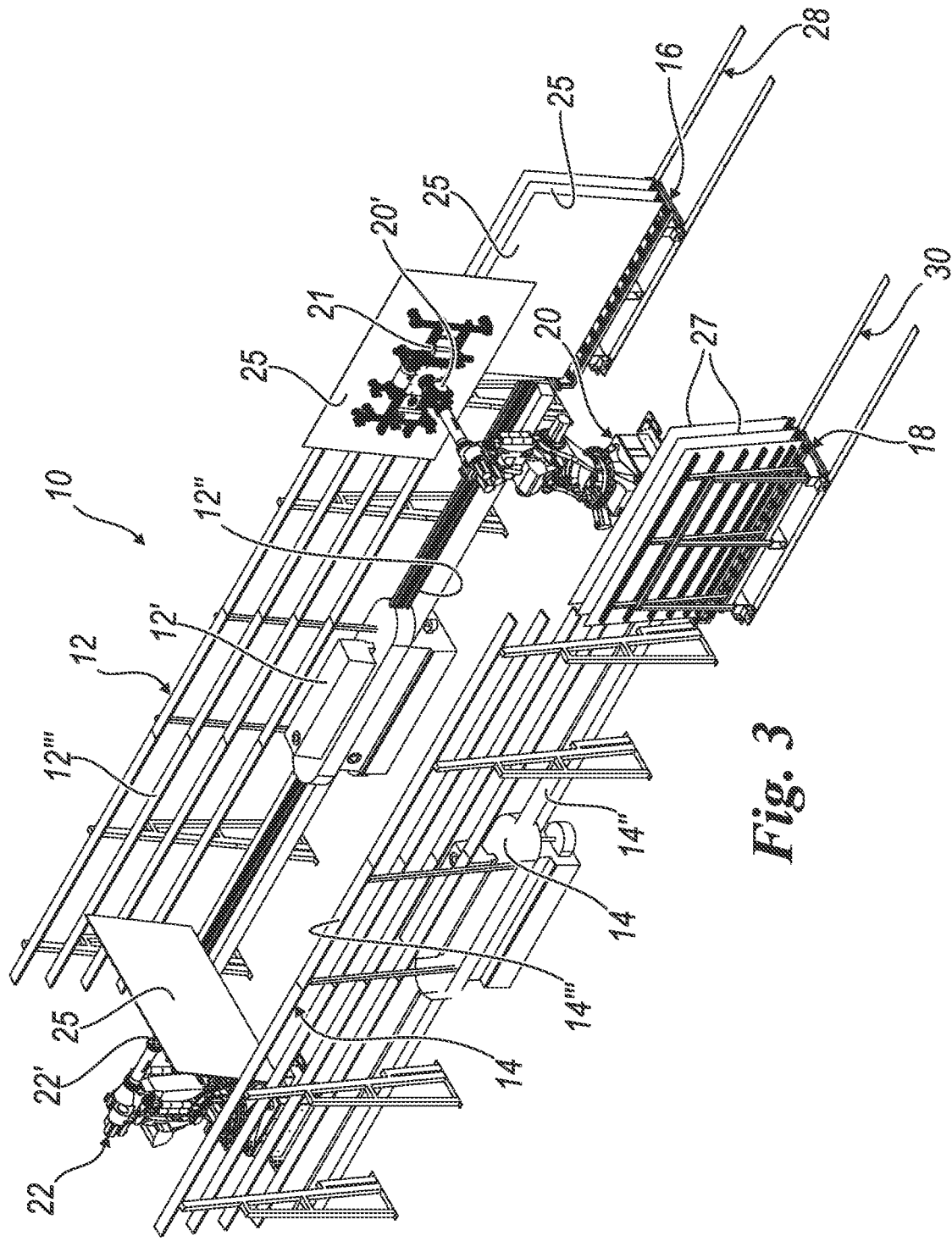
Figure 4:
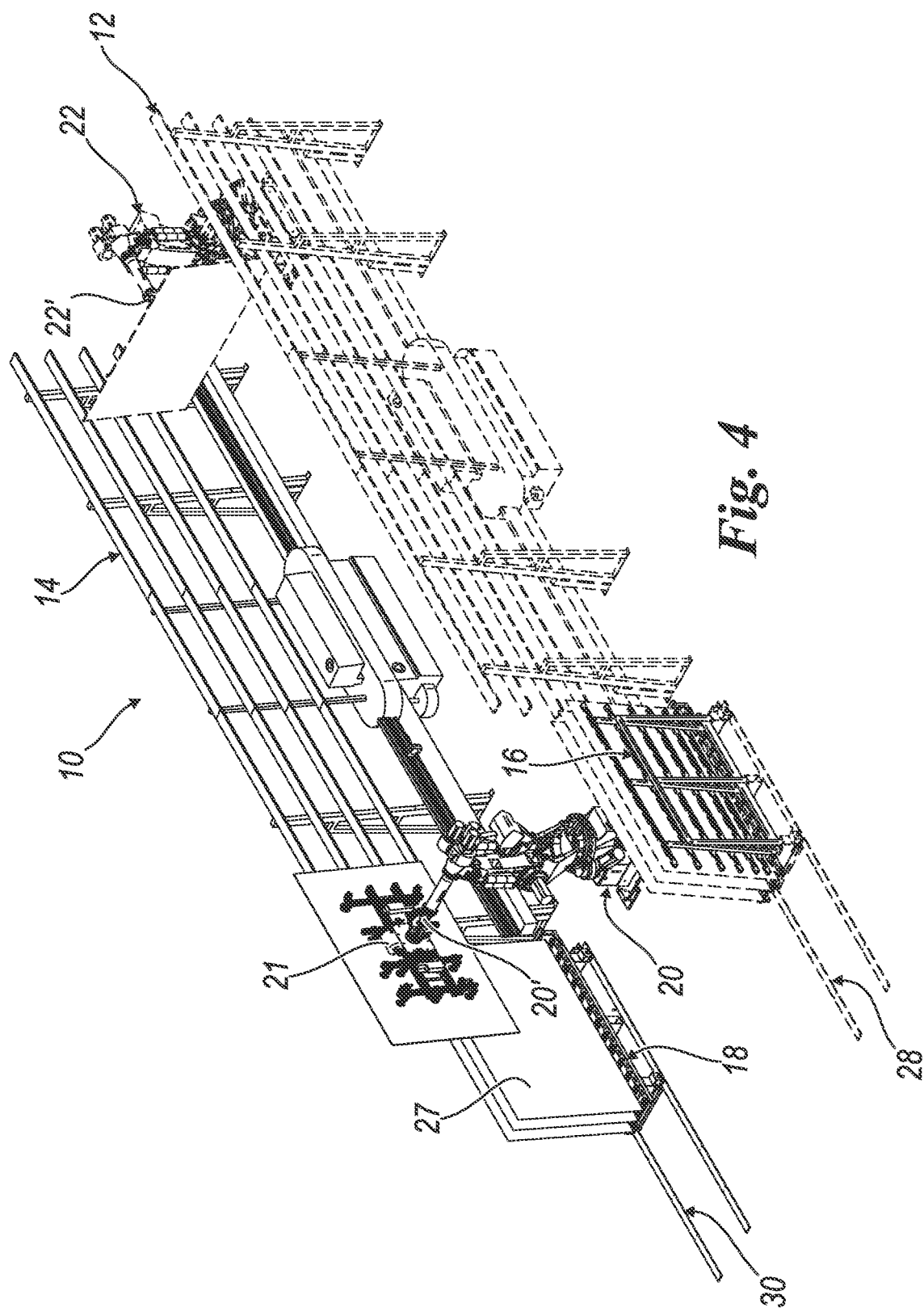
Figure 5:
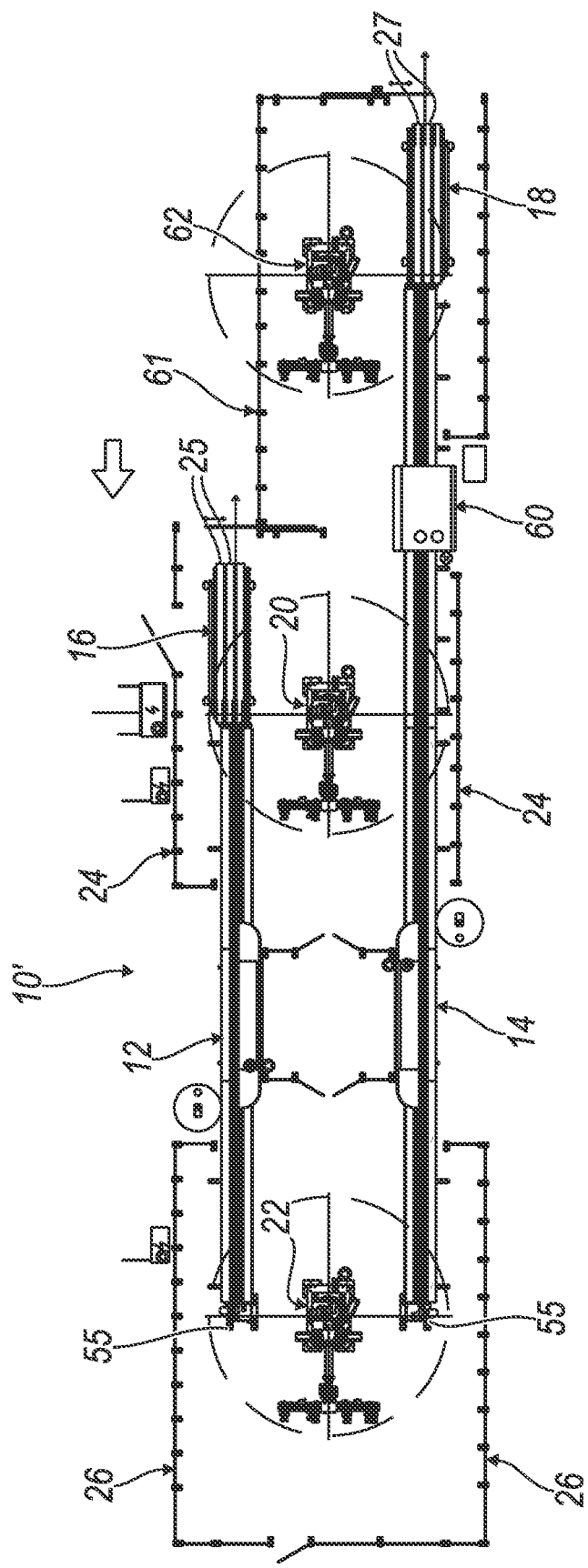
Figure 6:
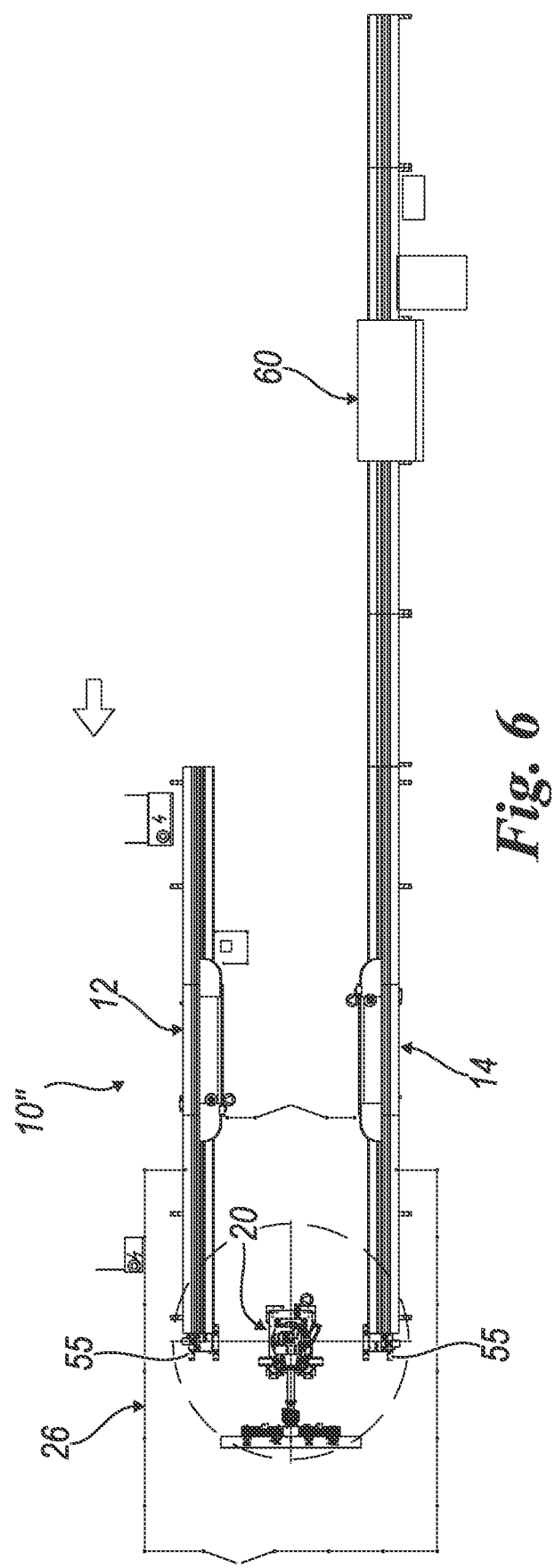

The constructional and functional characteristics of the apparatus and of the method for machining flat sheets according to the present invention can be better understood from the following detailed description, wherein reference is made to the attached drawings which illustrate a preferred, non-limitative embodiment, and wherein:

FIG. 1 schematically shows a top view of the apparatus for machining flat sheets of the present invention according to a first embodiment;

FIGS. 2 thru 4 schematically show, in an axonometric view, the sheets machining steps by using an apparatus according to the invention;

FIG. 5 schematically shows a top view of the apparatus for machining flat sheets of the present invention according to an alternative configuration;

FIG. 6 schematically shows a top view of the apparatus for machining flat sheets of the present invention according to a further, alternative embodiment.

DETAILED DESCRIPTION OF THE INVENTION

With reference to the mentioned figures, the modular apparatus for machining flat sheets according to the present invention, identified by the reference numeral 10 as a whole in the figures and described with reference to a first embodiment or configuration, wherein a sheet undergoes a grinding machining of the peripheral edge, comprises a first grinding machine 12 and a second grinding machine 14 arranged opposite and parallel to each other, a first store 16 suitable for receiving the sheets to be machined and a second store 18 suitable for receiving the machined sheets, a first manipulator 20 and a second manipulator 22, first protection elements 24 and second protection elements 26.

The first store 16 and the second store 18 are each defined by conventional racks, on which there are arranged, stacked one above the other, raw sheets (made from glass, plate glass, mirror or stone materials) to be machined 25 and finished sheets 27 whose edges have already been ground, respectively.

Such first and second stores 16 and 18 are moved automatically for that which concerns the functions of loading new sheets in the first store 16 and unloading sheets from the second store 18; as a matter of fact, as schematically shown in the figures, the first store 16 is translationally movable along first rails 28 and the second store 18 is translationally movable along second rails 30.

The first grinding machine 12 and the second grinding machine 14 are not described with reference to their constructional and operational details because they are already known; however, a number of constructional elements will be specified because they are worth to mention in the following description.

The two grinding machines comprise each a machining assembly (12' and 14' respectively) in which there are present the sheet machining means (of the tape or grindstone type), a rectilinear handling assembly (12" and 14" respectively), the machining assembly being arranged substantially midway in the longitudinal development of said handling assembly, to define a sheet input zone and a sheet output zone with respect to the machining assembly and, finally, a lateral support frame (12''' and 14''' respectively) which develops longitudinally all over the length of the rectilinear handling assembly and is suitable for operating as support for the sheet being in movement.

As described above, said grinding machines are arranged parallel and opposite to each other and, in particular, the first store 16 is arranged to serve the first grinding machine in correspondence with an input/loading (or head) zone for the glass sheets 25 on said first grinding machine 12 and the second store 18 is arranged to serve the second grinding machine 14 in correspondence with an unload (or tail) zone of the second grinding machine 14.

The first manipulator 20, which preferably consists of a robot of an antropomorphic type, is arranged between the first grinding machine 12 and the second grinding machine 14 and, in particular, in correspondence with the head zone of the first grinding machine and of the tail zone of the second grinding machine.

The second manipulator 22, also consisting of a robot of an antropomorphic type, is arranged between the first grinding machine 12 and the second grinding machine 14, opposite and parallel to the first manipulator 20 and, in particular, it is arranged in correspondence with the tail zone of the first grinding machine and of the head zone of the second grinding machine.

Said first and second manipulators 20 and 22 are arranged opposite and parallel to each other.

The first manipulator 20 and the second manipulator 22 are equipped, on the wrist 20' and on the wrist 22' respectively, with a suction clamp 21 and a suction clamp 23, possibly adjustable in order to fit different dimensions of sheets to be handled.

The first protection elements 24 are arranged in correspondence with the head and tail zones of the first grinding machine 12 and of the second grinding machine 14 respectively, to enclose the operating area of the first manipulator 20, the first store 16, and the second store 18.

Likewise, the second protection elements 26 are arranged in correspondence with the tail and head zones of the first grinding machine 12 and of the second grinding machine 14 respectively, to enclose the operating area of the second manipulator 22.

The apparatus according to the invention which, as already said, is of the modular type, possibly comprises other machines suitable for varying the above described configuration or for modifying it in accordance with specific machining requirements.

More specifically, schematically shown in FIG. 5, the apparatus according to the invention can be reconfigured (the apparatus is identified by the reference numeral 10' in FIG. 5) by arranging a washing machine 60 downstream of the second grinding machine 14, suitable for performing a washing operation before unloading and storing the flat sheets.

In this event, the second store 18 is not positioned in correspondence with the tail portion of the second grinding machine 14, but rather downstream of the washing machine 60 (i.e. at the output).

In such type of operational configuration, the apparatus according to the invention comprises a third manipulator 62 the function of which is to pick-up the flat sheets and to unload them onto the second store 18 and further protection elements 61 consisting of barriers or the like.

The apparatus according to the invention can also be reconfigured by adding further and different moduli such as, for instance, a corner cutting machine 55 or a drill, which might be arranged downstream of the first grinding machine 12 or upstream or downstream of the second grinding machine 14 or, alternatively, in correspondence with the head portion of the first grinding machine, as a function of the specific machining and production requirements.

The modular apparatus according to the invention can also be configured in a "hybrid" machining mode (schematically shown in FIG. 6), i.e. a configuration wherein, for instance in the case of an apparatus wherein grinding machinings only are present, one only manipulator 20 is present, the function of which is to perform transfer operations of the sheets being machined from a first automatic machinery 12 to a second automatic machinery 14, whereas the unloading operations are performed manually by an operator; in this configuration too, the integration of further moduli is possible such as, for instance, a washing machine 60 or a drill or another sheet machining device which, for instance, might be arranged downstream of the grinding machines.

The apparatus according the invention is also equipped with a control panel which makes up an operator interface interfacing to a control unit and makes it possible for the operator to display and set the manufacturing steps, to monitor the machining cycle, and to modify the machining parameters as a function of the data coming from the sensors.

The operation of the apparatus for machining flat sheets according to the present invention, as described in details with reference to its own component parts, is described below.

Considering the preferred configuration illustrated in the figures, a single sheet to be machined, identified by the reference numeral 25 in the figures, arranged on the first store 16 together with other sheets, is picked-up by the first manipulator 20 by way of the suction clamp 21 from a stack of sheets arranged on the first store and positioned, one edge being on the rectilinear handling assembly 12" and the surface of the sheet resting on the lateral support frame 12''' of the first grinding machine 12 in correspondence with the input/loading or head zone, the rectilinear handling assembly feeds the sheet in the direction of the machining assembly 12' where the machining tools will grind the mentioned edge, and subsequently the sheet, still being fed, leaves the machining assembly and, still being driven by the rectilinear handling assembly, moves forward in the direction of the output/unloading or tail zone.

At this point, the second manipulator 22 picks-up the sheet from the first grinding machine and places it onto the second grinding machine 14, one edge to be machined being on the rectilinear handling assembly 14" and the surface of the sheet resting on the lateral support frame 14''' of the second grinding machine 14.

More specifically, the second manipulator 22 rotates the sheet (for instance by 90°) in order to orient the sheet with the correct edge to be machined on the second grinding machine 14.

The sheet so arranged moves forward in the direction of the machining assembly 14" and leaves it in correspondence with the tail portion of said second grinding machine, where it is picked-up again from by first manipulator 20, which either re-positions the sheet onto the first grinding machine (if further edges have to be machined) or arranges it onto the second store 18 in order for it to be unloaded. The second store 18, when filled with a predetermined number of machined sheets 27, is moved towards an unloading zone (not represented in the figures) by running along the rails 30.

Likewise, the first store 16, whenever there are no more sheets to be machined present thereon, is moved by way of said first rails 28 in the direction of a loading zone (also not shown) where new sheets to be machined 25 will be loaded.

Considering, for example, the case of sheets of a rectangular shape, the first manipulator 20 loads the sheets to be machined 25 onto the first grinding machine 12, staggered each other, i.e. a first sheet being arranged along the long side and a second and subsequent sheet being arranged along the short side; this allows to have a total machining time in the second machine equal to that of the first grinding machine when sheets are transferred onto the second grinding machine 14, and, also, it allows to load the two grinding machines to their respective maximum rated loads.

In the case of a configuration wherein, in addition to the two grinding machines, there are also present other machines (such as, for instance, a corner cutting machine and/or a washing machine), the sheet that has been ground along part of or all the peripheral edge is transferred by the first manipulator to a further machine (corner cutting machine, drill, washing machine) in which further machinings are performed on the same sheet and, when said machinings are over, a third manipulator picks-up the sheet and arranges it onto the second store 18 which subsequently conveys the sheets stocked thereon to an unloading or storage station.

The advantages the apparatus according to the invention are apparent from the foregoing.

The apparatus for grinding flat sheets made from glass, plate glass, mirror, or sheets made from marble or granite or similar stone materials according to the present invention allows, thanks to its modularity which provides configuration and reconfiguration capabilities, to make the machining cycle of the flat sheets highly flexible and to completely automate it so as to obtain, at the output from the apparatus, a finished product ready for being stored or packed.

Further advantageous is the fact that the modular apparatus according to the invention makes it possible to accomplish a time cycle optimization and a radical reduction of the dead times bound to the movements of the sheets themselves.

Further advantageous is the fact that, in the case of a configuration wherein grinding machines only are present, the apparatus according to the invention makes it possible to machine flat sheets along all edges without any need for replacing the grinding machines by using, for instance, bilateral machines.

Further advantageous is the fact that the automated loading procedure makes it possible to load the grinding machine in a continuous and balanced manner, a condition that makes it possible for the grinding machines to operate optimally while providing high quality and homogeneous machining.

A further advantage consists in that the apparatus according to the invention does not require to set up special plants, but rather it can be implemented by adapting conventional machines used for machining flat sheets.

Whereas the invention has been described here above with a particular reference to one embodiment which has been described for explanatory, non-limitative purposes only, numerous modifications and variants will be apparent to those skilled in the art in the light of the above description. Therefore, the present invention is to be construed to embrace any modifications and variants that fall within the scope of the following claims.

The invention claimed is:

1. A modular apparatus (10) for machining flat sheets in a continuous cycle, the modular apparatus arranged according to a U-shaped path comprising:
   a sheet input zone; a
   sheet output zone;
   a first store (16) suitable for receiving sheets to be machined (25),
   a second store (18), parallel and opposed to said first store (16), suitable for receiving machined sheets (27);
   a plurality of sheet machining moduli comprising a first grinding machine (12) and a second grinding machine (14) arranged parallel and opposite to each other and suitable for performing grinding machining along peripheral edges of vertically arranged sheets (25);
   one or more further sheet machining moduli including any combination of one or more corner cutting machines or drills or washing machines, in communication with said first or second grinding machines (12, 14), and
   a first manipulator (20) and a second manipulator (22) arranged in a space between the first grinding machine and the second grinding machine, said first manipulator and said second manipulator adapted for picking up and transferring said flat sheets between said sheet machining moduli;
   wherein the first store (16) is placed adjacent to the sheet input zone where said sheets to be machined (25) are input, and wherein the second store (18) is placed adjacent to the sheet output zone of the second grinding machine (14) or of the further machining module.

2. The apparatus according to claim 1, wherein the first store (16) is translationally movable along first rails (28) and the second store (18) is translationally movable along second rails (30).

3. The apparatus according to claim 1, wherein the first manipulator (20) and the second manipulator (22) are arranged parallel and opposite to each other, and wherein each of the first manipulator and the second manipulator comprise a suction clamp (21, 23) for grabbing and handling said sheets.

4. The apparatus according to claim 3, wherein the first manipulator (20) is arranged adjacent to the input zone of the first grinding machine (12) and of the output zone of the second grinding machine (14), the second manipulator (22) being arranged adjacent to the output zone of the first grinding machine (12) and of the input zone of the second grinding machine (14) and in that a third manipulator (62) is arranged adjacent to the output zone of the further machining module.

5. The apparatus according to claim 1, wherein said at least one manipulator comprises an anthropomorphic robot.

6. The apparatus according to claim 1, further comprising a first protection elements (24), a second protection elements (26), and a third protection element (61), to enclose the operating areas of the machining moduli, respectively.

7. The apparatus according to claim 1, further comprising a third manipulator adapted for picking up and transferring said flat sheets between said sheet machining moduli.

8. A method for machining flat glass sheets implemented according to the apparatus according to claim 1, further comprising performing machining on the flat sheets in a continuous cycle.

9. The method according to claim 8, further comprising the following sequence of steps:
   picking-up a flat sheet to be machined (25) from the first store (16) by means of the first manipulator (20) and positioning it onto the first grinding machine (12) adjacent to the input zone;
   moving the sheet (25) to a machining assembly (12') of the first grinding machine for machining a first edge of said sheet;
   picking-up said sheet from the first grinding machine adjacent to the output zone thereof by means of the second manipulator (22) and positioning onto the second grinding machine (14) adjacent to the input zone of said second grinding machine;
   moving the sheet and transferring the sheet to a machining assembly (14') of the second grinding machine (14) in order for an additional edge of said sheet to be machined;

picking-up said sheet from the second grinding machine (14) adjacent to the output zone thereof by means of the first manipulator (20);

re-positioning said sheet onto the first grinding machine (12) adjacent to the input zone of said first grinding machine in order for a further edge to be machined; or unloading the finished sheet (27) onto the second store (18) by means of the first manipulator (20).

10. The method according claim 9, further comprising the steps of loading the flat sheets to be machined (25) onto the first store and of unloading the machined flat sheets (27) onto the second store (18), wherein said loading/unloading steps are performed while said first store (16) and second store (18) are moved along the rails (28) and (30) respectively.

* * * * *